United States Patent
Ederer et al.

(10) Patent No.: US 11,235,518 B2
(45) Date of Patent: Feb. 1, 2022

(54) METHOD AND DEVICE FOR PRODUCING THREE-DIMENSIONAL COMPONENTS WITH THE AID OF AN OVERFEED SENSOR

(71) Applicant: Voxeljet AG, Friedberg (DE)

(72) Inventors: Ingo Ederer, Geltendorf (DE); Daniel Günther, Munich (DE); Johannes Günther, Martinsried (DE)

(73) Assignee: VOXELJET AG, Friedberg (DE)

( * ) Notice: Subject to any disclaimer, the term of this patent is extended or adjusted under 35 U.S.C. 154(b) by 841 days.

(21) Appl. No.: 15/364,613

(22) Filed: Nov. 30, 2016

(65) Prior Publication Data

US 2017/0151727 A1    Jun. 1, 2017

(30) Foreign Application Priority Data

Dec. 1, 2015  (DE) ................ 10 2015 015 353.6

(51) Int. Cl.
| | |
|---|---|
| *B29C 64/153* | (2017.01) |
| *B33Y 10/00* | (2015.01) |
| *B33Y 50/02* | (2015.01) |
| *B33Y 40/00* | (2020.01) |
| *B29C 64/165* | (2017.01) |
| *B29C 64/214* | (2017.01) |
| *B33Y 30/00* | (2015.01) |
| *B22F 12/00* | (2021.01) |
| *B29K 105/00* | (2006.01) |

(52) U.S. Cl.
CPC .......... *B29C 64/153* (2017.08); *B29C 64/165* (2017.08); *B29C 64/214* (2017.08); *B33Y 10/00* (2014.12); *B33Y 30/00* (2014.12); *B33Y 40/00* (2014.12); *B33Y 50/02* (2014.12); *B22F 12/00* (2021.01); *B29K 2105/251* (2013.01)

(58) Field of Classification Search
CPC ..... B29C 64/153; B29C 64/165; B29C 64/20; B29C 64/386; B29C 64/393; B29C 64/214; B29C 64/30; B29C 2037/90; B29C 2037/903; B33Y 10/00; B33Y 30/00; B33Y 40/00; B33Y 50/02; B22F 2003/1056; B22F 2003/1057; B22F 2203/00; B22F 2203/03; B22F 3/008; B28B 1/001

See application file for complete search history.

(56) References Cited

U.S. PATENT DOCUMENTS

| | | |
|---|---|---|
| 3,913,503 A | 10/1975 | Becker |
| 4,247,508 A | 1/1981 | Housholder |
| 4,575,330 A | 3/1986 | Hull |
| 4,591,402 A | 5/1986 | Evans et al. |

(Continued)

FOREIGN PATENT DOCUMENTS

| | | |
|---|---|---|
| AU | 720255 B2 | 5/2000 |
| DE | 3221357 A1 | 12/1983 |

(Continued)

OTHER PUBLICATIONS

US 4,937,420 A, 06/1990, Deckard (withdrawn)

(Continued)

*Primary Examiner* — Leith S Shafi (74) *Attorney, Agent, or Firm* — The Dobrusin Law Firm, P.C.

(57) ABSTRACT

The invention relates to a 3D printing method and, in particular, a device and a method for setting an overfeed.

19 Claims, 8 Drawing Sheets

(56) References Cited

U.S. PATENT DOCUMENTS

| | | |
|---|---|---|
| 4,600,733 A | 7/1986 | Ohashi et al. |
| 4,665,492 A | 5/1987 | Masters |
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,076,869 A | 12/1991 | Bourell et al. |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,229,209 A | 7/1993 | Gharapetian et al. |
| 5,248,456 A | 8/1993 | Evans, Jr. et al. |
| 5,252,264 A | 10/1993 | Forderhase et al. |
| 5,263,130 A | 11/1993 | Pomerantz et al. |
| 5,269,982 A | 12/1993 | Brotz |
| 5,284,695 A | 2/1994 | Barlow et al. |
| 5,296,062 A | 3/1994 | Bourell et al. |
| 5,316,580 A | 5/1994 | Deckard |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,482,659 A | 1/1996 | Sauerhoefer |
| 5,490,962 A | 2/1996 | Cima et al. |
| 5,503,785 A | 4/1996 | Crump et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,721 A | 11/1996 | Gillette |
| 5,589,222 A | 12/1996 | Thometzek et al. |
| 5,597,589 A | 1/1997 | Deckard |
| 5,616,294 A | 4/1997 | Deckard |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,807,437 A | 9/1998 | Sachs et al. |
| 5,837,960 A | 11/1998 | Lewis et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,906,294 A * | 5/1999 | Ikeya .................... B65G 27/00 222/200 |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 5,997,795 A | 12/1999 | Danforth |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,048,954 A | 4/2000 | Barlow et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,175,422 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,259,962 B1 | 7/2001 | Gothait |
| 6,270,335 B2 | 8/2001 | Leyden et al. |
| 6,305,769 B1 | 10/2001 | Thayer et al. |
| 6,316,060 B1 | 11/2001 | Elvidge et al. |
| 6,318,418 B1 | 11/2001 | Grossmann et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 | 7/2002 | Bredt et al. |
| 6,423,255 B1 | 7/2002 | Hoechsmann et al. |
| 6,460,979 B1 | 10/2002 | Heinzl et al. |
| 6,476,122 B1 | 11/2002 | Leyden |
| 6,485,831 B1 | 11/2002 | Fukushima et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,610,429 B2 | 8/2003 | Bredt et al. |
| 6,616,030 B2 | 9/2003 | Miller |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,742,456 B1 | 6/2004 | Kasperchik et al. |
| 6,764,636 B1 | 7/2004 | Allanic et al. |
| 6,827,988 B2 | 12/2004 | Krause et al. |
| 6,830,643 B1 | 12/2004 | Hayes |
| 6,838,035 B1 | 1/2005 | Ederer et al. |
| 6,855,205 B2 | 2/2005 | McQuate et al. |
| 6,896,839 B2 | 5/2005 | Kubo et al. |
| 6,972,115 B1 | 12/2005 | Ballard |
| 6,989,115 B2 | 1/2006 | Russell et al. |
| 7,004,222 B2 | 2/2006 | Ederer et al. |
| 7,037,382 B2 | 5/2006 | Davidson et al. |
| 7,048,530 B2 | 5/2006 | Gaillard et al. |
| 7,049,363 B2 | 5/2006 | Shen |
| 7,087,109 B2 | 8/2006 | Bredt et al. |
| 7,120,512 B2 | 10/2006 | Kramer et al. |
| 7,137,431 B2 | 11/2006 | Ederer et al. |
| 7,153,463 B2 | 12/2006 | Leuterer et al. |
| 7,204,684 B2 | 4/2007 | Ederer et al. |
| 7,220,380 B2 | 5/2007 | Farr et al. |
| 7,291,002 B2 | 11/2007 | Russell et al. |
| 7,296,990 B2 | 11/2007 | Devos et al. |

(56) References Cited

U.S. PATENT DOCUMENTS

| | | |
|---|---|---|
| 7,332,537 B2 | 2/2008 | Bredt et al. |
| 7,348,075 B2 | 3/2008 | Farr et al. |
| 7,378,052 B2 | 5/2008 | Harryson |
| 7,381,360 B2 | 6/2008 | Oriakhi et al. |
| 7,387,359 B2 | 6/2008 | Hernandez et al. |
| 7,402,330 B2 | 7/2008 | Pfeiffer et al. |
| 7,431,987 B2 | 10/2008 | Pfeiffer et al. |
| 7,435,072 B2 | 10/2008 | Collins et al. |
| 7,435,368 B2 | 10/2008 | Davidson et al. |
| 7,455,804 B2 | 11/2008 | Patel et al. |
| 7,455,805 B2 | 11/2008 | Oriakhi et al. |
| 7,497,977 B2 | 3/2009 | Nielsen et al. |
| 7,531,117 B2 | 5/2009 | Ederer et al. |
| 7,550,518 B2 | 6/2009 | Bredt et al. |
| 7,578,958 B2 | 8/2009 | Patel et al. |
| 7,597,835 B2 | 10/2009 | Marsac |
| 7,641,461 B2 | 1/2010 | Khoshnevis |
| 7,665,636 B2 | 2/2010 | Ederer et al. |
| 7,722,802 B2 | 5/2010 | Pfeiffer et al. |
| 7,807,077 B2 | 5/2010 | Ederer et al. |
| 7,736,578 B2 | 6/2010 | Ederer et al. |
| 7,748,971 B2 | 7/2010 | Hochsmann et al. |
| 7,767,130 B2 | 8/2010 | Elsner et al. |
| 7,795,349 B2 | 9/2010 | Bredt et al. |
| 7,799,253 B2 | 9/2010 | Höchsmann et al. |
| 7,879,393 B2 | 2/2011 | Ederer et al. |
| 7,887,264 B2 | 2/2011 | Naunheimer et al. |
| 7,927,539 B2 | 4/2011 | Ederer |
| 8,020,604 B2 | 9/2011 | Hochsmann et al. |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Hochsmann et al. |
| 8,524,142 B2 | 9/2013 | Unkelmann et al. |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Höchsmann et al. |
| 8,956,140 B2 | 2/2015 | Hartmann |
| 8,956,144 B2 | 2/2015 | Grasegger et al. |
| 8,992,205 B2 | 3/2015 | Ederer et al. |
| 9,174,391 B2 | 11/2015 | Hartmann et al. |
| 9,174,392 B2 | 11/2015 | Hartmann |
| 9,242,413 B2 | 1/2016 | Hartmann et al. |
| 9,321,934 B2 | 4/2016 | Mögele et al. |
| 9,327,450 B2 | 5/2016 | Hein et al. |
| 9,333,709 B2 | 5/2016 | Hartmann |
| 9,358,701 B2 | 6/2016 | Gnuchtel et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1* | 6/2002 | Russell ............... B29C 64/165 264/40.1 |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0065400 A1 | 4/2003 | Beam et al. |
| 2003/0069638 A1 | 4/2003 | Barlow et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0104515 A1 | 6/2004 | Swanson et al. |
| 2004/0112523 A1 | 6/2004 | Crom |
| 2004/0138336 A1 | 7/2004 | Bredt et al. |
| 2004/0145088 A1 | 7/2004 | Patel et al. |
| 2004/0170765 A1 | 9/2004 | Ederer et al. |
| 2004/0173946 A1 | 9/2004 | Pfeifer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2004/0265413 A1* | 12/2004 | Russell ............... B29C 64/112 425/375 |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0093194 A1 | 5/2005 | Oriakhi et al. |
| 2005/0167872 A1 | 8/2005 | Tsubaki et al. |
| 2005/0174471 A1 | 8/2005 | Johnson et al. |
| 2005/0179167 A1 | 8/2005 | Hachikian |
| 2005/0211163 A1* | 9/2005 | Li ............... C23C 24/00 118/308 |
| 2005/0212163 A1 | 9/2005 | Bausinger et al. |
| 2005/0218549 A1 | 10/2005 | Farr et al. |
| 2005/0219942 A1 | 10/2005 | Wallgren |
| 2005/0280185 A1* | 12/2005 | Russell ............... B28B 1/001 264/308 |
| 2005/0283136 A1 | 12/2005 | Skarda |
| 2006/0013659 A1 | 1/2006 | Pfeiffer et al. |
| 2006/0105102 A1 | 5/2006 | Hochsmann et al. |
| 2006/0108090 A1 | 5/2006 | Ederer et al. |
| 2006/0159896 A1 | 7/2006 | Pfeifer et al. |
| 2006/0175346 A1 | 8/2006 | Ederer et al. |
| 2006/0208388 A1 | 9/2006 | Bredet et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0054143 A1 | 3/2007 | Otoshi |
| 2007/0057412 A1 | 3/2007 | Weiskopf et al. |
| 2007/0065397 A1 | 3/2007 | Ito et al. |
| 2007/0126157 A1 | 6/2007 | Bredt |
| 2007/0215020 A1 | 9/2007 | Miller |
| 2007/0238056 A1 | 10/2007 | Baumann et al. |
| 2008/0001331 A1 | 1/2008 | Ederer |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner et al. |
| 2008/0237933 A1 | 10/2008 | Hoehmann et al. |
| 2008/0241404 A1* | 10/2008 | Allaman ............... B29C 64/165 427/333 |
| 2008/0260945 A1 | 10/2008 | Ederer et al. |
| 2008/0299321 A1 | 12/2008 | Ishihara |
| 2009/0011066 A1 | 1/2009 | Davidson et al. |
| 2009/0068376 A1 | 3/2009 | Philippi et al. |
| 2009/0261497 A1 | 10/2009 | Ederer et al. |
| 2010/0007062 A1 | 1/2010 | Larsson et al. |
| 2010/0026743 A1 | 2/2010 | Van Thillo et al. |
| 2010/0152865 A1 | 6/2010 | Jonsson et al. |
| 2010/0207288 A1 | 8/2010 | Enrico |
| 2010/0212584 A1 | 8/2010 | Ederer et al. |
| 2010/0243123 A1 | 9/2010 | Voxeljet |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kahani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2011/0308755 A1 | 12/2011 | Hochsmann |
| 2012/0046779 A1 | 2/2012 | Pax et al. |

(56) References Cited

U.S. PATENT DOCUMENTS

| | | |
|---|---|---|
| 2012/0094026 A1 | 4/2012 | Ederer et al. |
| 2012/0097258 A1 | 4/2012 | Harmann et al. |
| 2012/0113439 A1 | 5/2012 | Ederer et al. |
| 2012/0126457 A1 | 5/2012 | Abe et al. |
| 2012/0189102 A1 | 7/2012 | Maurer, Jr. et al. |
| 2012/0291701 A1 | 11/2012 | Grasegger et al. |
| 2012/0329943 A1 | 12/2012 | Hicks et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0052291 A1* | 2/2013 | Morikawa ............ B29C 64/357 425/135 |
| 2013/0078325 A1* | 3/2013 | Sperry ................. B29C 64/106 425/169 |
| 2013/0092082 A1 | 4/2013 | Ederer et al. |
| 2013/0157193 A1 | 6/2013 | Moritani et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0048980 A1 | 2/2014 | Crump et al. |
| 2014/0002023 A1 | 7/2014 | Ederer et al. |
| 2014/0202382 A1 | 7/2014 | Ederer |
| 2014/0212677 A1 | 7/2014 | Gnuchtel et al. |
| 2014/0227123 A1 | 8/2014 | Gunster |
| 2014/0236339 A1 | 8/2014 | Fagan |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Ederer et al. |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0251336 A1* | 9/2015 | Goto .................... B33Y 30/00 428/413 |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0318251 A1 | 3/2016 | Ederer et al. |
| 2016/0107386 A1 | 4/2016 | Hartmann et al. |
| 2016/0114533 A1 | 4/2016 | Grassegger et al. |
| 2016/0228987 A1* | 8/2016 | Baudimont ........... B22F 3/1055 |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2017/0028630 A1 | 2/2017 | Ederer et al. |
| 2017/0050378 A1 | 2/2017 | Ederer |
| 2017/0050387 A1 | 2/2017 | Ederer |
| 2017/0106595 A1 | 4/2017 | Gunther et al. |
| 2017/0136524 A1 | 5/2017 | Ederer et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0210037 A1 | 7/2017 | Ederer et al. |
| 2017/0297263 A1 | 10/2017 | Ederer et al. |
| 2017/0305139 A1 | 10/2017 | Hartmann |
| 2017/0355137 A1 | 12/2017 | Ederer et al. |
| 2018/0079133 A1 | 3/2018 | Ederer et al. |
| 2018/0141271 A1 | 5/2018 | Gunter et al. |
| 2018/0326662 A1 | 11/2018 | Gunther et al. |
| 2018/0369910 A1 | 12/2018 | Gunter et al. |
| 2019/0047218 A1 | 2/2019 | Ederer et al. |
| 2019/0084229 A1 | 3/2019 | Gunther |

FOREIGN PATENT DOCUMENTS

| | | | |
|---|---|---|---|
| DE | 3930750 C2 | 3/1991 | |
| DE | 4102260 A1 | 7/1992 | |
| DE | 4305201 C1 | 4/1994 | |
| DE | 4 325 573 | 2/1995 | |
| DE | 29506204 U1 | 6/1995 | |
| DE | 4440397 | 9/1995 | |
| DE | 19525307 A1 | 1/1997 | |
| DE | 19530295 C1 | 1/1997 | |
| DE | 19528215 A1 | 2/1997 | |
| DE | 29701279 U1 | 5/1997 | |
| DE | 19545167 A1 | 6/1997 | |
| DE | 69031808 T2 | 4/1998 | |
| DE | 19853834 | 5/2000 | |
| DE | 102011088158 B2 | 5/2000 | |
| DE | 69634921 T2 | 12/2005 | |
| DE | 201 22 639 U1 | 11/2006 | |
| DE | 10 2006 040 305 A1 | 3/2007 | |
| DE | 102006029298 A1 | 12/2007 | |
| DE | 102007040755 A1 | 3/2009 | |
| DE | 102007047326 A1 | 4/2009 | |
| DE | 102011053205 A1 | 3/2013 | |
| DE | 102011088158 A1 * | 6/2013 | ........... B23K 26/144 |
| DE | 102015006363 A1 | 12/2016 | |
| DE | 102015008860 A1 | 1/2017 | |
| DE | 102015011503 A1 | 3/2017 | |
| DE | 102015011790 A1 | 3/2017 | |
| EP | 361847 B1 | 4/1990 | |
| EP | 0431924 B1 | 6/1991 | |
| EP | 1415792 | 5/2004 | |
| EP | 1457590 A | 9/2004 | |
| EP | 1381504 B1 | 8/2007 | |
| EP | 2774693 A1 * | 9/2014 | |
| FR | WO2015040327 A1 * | 3/2015 | ............. B22F 3/008 |
| GB | 2297516 A | 8/1996 | |
| JP | S62275734 A | 11/1987 | |
| JP | H0889780 A * | 4/1996 | ......... G01N 15/0227 |
| JP | 2003136605 A | 5/2003 | |
| JP | 2004082206 A | 3/2004 | |
| JP | 2009202451 A | 9/2009 | |
| WO | 01/40866 A2 | 6/2001 | |
| WO | 2001/078969 A2 | 10/2001 | |
| WO | 2004/014637 A1 | 2/2004 | |
| WO | 2006/100166 A1 | 9/2006 | |
| WO | 2008/049384 A1 | 5/2008 | |
| WO | 2008061520 A2 | 5/2008 | |
| WO | 2011063786 A1 | 6/2011 | |
| WO | 2013075696 A1 | 5/2013 | |
| WO | 2014090207 A1 | 6/2014 | |
| WO | 2014166469 A1 | 10/2014 | |
| WO | 2014078430 A1 | 6/2015 | |
| WO | 2015081926 A1 | 6/2015 | |
| WO | 2015085983 A2 | 6/2015 | |
| WO | 2015090265 A1 | 6/2015 | |
| WO | 2015090567 A1 | 6/2015 | |
| WO | 2015096826 A1 | 7/2015 | |
| WO | 2015149742 A1 | 10/2015 | |
| WO | 2015180703 A1 | 12/2015 | |
| WO | 2016019937 A1 | 2/2016 | |
| WO | 2016019942 A1 | 2/2016 | |
| WO | WO2016040453 A1 | 3/2016 | |
| WO | 2016058577 A1 | 4/2016 | |
| WO | 2016095888 A1 | 6/2016 | |
| WO | 2016101942 A1 | 6/2016 | |
| WO | 2016146095 A1 | 9/2016 | |

OTHER PUBLICATIONS

Marcus et al., Solid Freedom Fabrication Proceedings, Nov. 1993.
Cima et al., "Computer-derived Microstructures by 3D Printing: Bio- and Structural Materials," SFF Symposium, Austin, TX, 1994.
Marcus, et al., Solid Freeform Fabrication Proceedings, Sep. 1995, p. 130-133.
Gebhart, Rapid Prototyping, pp. 118-119, 1996.
Feature Article—Rapid Tooling—Cast Resin and Sprayed Metal Tooling by Joel Segal, Apr. 2000.

(56) References Cited

OTHER PUBLICATIONS

EOS Operating Manual for Laser Sintering Machine with Brief Summary Feb. 22, 2005.
Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlant, GA, Mar. 25-28). ASME, New York, 1990, pp. 131-136.
Sachs et al., "Three-Dimensional Printing: Rapid Tooling and Prototypes Directly from a CAD Model", Massachusetts Institute of Technology, pp. 143-151, Jan. 1990.
Williams, "Feasibility Study of Investment Casting Pattern Design by Means of Three Dimensional Printing", Department of Mechanical Engineering, abstract only; Sep. 25, 2001.
Armin Scharf, "Erster 3D-Endlosdrucker", zwomp.de, http://www.zwomp.de/2012/11/06/voxeljet-endlosdrucker/ dated Nov. 6, 2012.
Voxeljet's VXconcept—Continuous 3D printing for sand casting, You-Tube, Nov. 16, 2011, XP002713379, retrieved from the Internet URL: http://www.youtube.com/watch?v=hgIrNXZjIxU retrieved on Sep. 23, 2013.
Screen shots of URL: http://www.youtube.com/watch?v=hgIrNXZjIxU taken in approximately 5 second intervals on Nov. 12, 2015.
Jacobs et al., 2005 SME Technical Paper, title "Are QuickCast Patterns Suitable for Limited Production?".
European Search Report, EP Application No. 16200616, dated May 18, 2017.

\* cited by examiner

METHOD AND DEVICE FOR PRODUCING THREE-DIMENSIONAL COMPONENTS WITH THE AID OF AN OVERFEED SENSOR

CLAIM OF PRIORITY

The present application claims priority to German Patent Application DE 10 2015 015 353.6 filed on Dec. 1, 2015, by Ederer et al., the contents of which are incorporated herein by reference in its entirety.

FIELD

The present invention relates to a method for producing three-dimensional components, amorphous particulate material being applied in layers to a build space, particulate material being placed on a build space in front of a scraper apparatus and then spread out, and the particulate material being subsequently solidified.

The invention furthermore relates to a device for producing three-dimensional components, comprising a coating device which includes a scraper apparatus and comprising a selective solidification apparatus.

BACKGROUND

A method for producing three-dimensional objects from computer data is described in the European patent specification EP 0 431 924 B1. In this method, a particulate material is applied in a thin layer to a platform with the aid of a coater, and a binder material is selectively printed onto this particulate material, using a print head. The particle area onto which the binder is printed is bound and solidifies under the influence of the binder and possible an additional hardener. The building platform is then lowered by the thickness of one layer, or the coater/print head unit is raised, and a new layer of particulate material is applied, which is also selectively printed upon as described above. These steps are repeated until the desired height of the object is reached. A three-dimensional object (molded part) is thus produced from the printed and solidified areas.

After it is completed, this object produced from solidified particulate material is embedded in loose particulate material and is subsequently removed therefrom. This is done, for example, using an extractor. This leaves the desired objects, from which powder deposits are removed, for example by manual brushing.

Of the layering techniques, 3D printing based on powdered materials and the supply of liquids with the aid of a print head is the fastest method.

This method may be used to process different fluids, such as particulate materials, including natural biological raw materials, polymers, metals, ceramics and sands (not an exhaustive list).

In addition, other methods exist, such as the fused deposition modeling (FDM) layering method, in which the cross sections of the component are built up by a liquid medium which solidifies outside a nozzle, the position of the building platform is changed from the last position by one layer thickness, and these steps are be repeated until the component is finished.

All these methods are referred to collectively below as "layering methods," "three-dimensional printing methods" or 3D printing methods.

Other powder-supported rapid prototyping processes work in a similar manner, for example selective laser sintering or electron beam sintering, in which a loose particulate material is also deposited in layers and selectively solidified with the aid of a controlled physical radiation source. The material is thus solidified by high-energy radiation. In conventional production systems, the components are frequently produced in layers vertically from top to bottom.

In 3D printing using the binder jetting technique, powders are the basis for the process. They are repeatedly applied in thin layers onto a building platform and printed with binder. The building platform is lowered for each new layer. Similarly, the coater plane may be raised, or the building platform may be designed as a conveyor belt.

The material may be provided, for example, in a silo and transferred to the production machine with the aid of screw conveyors. The binder is introduced by manually inserting binder-filled canisters, and the build container may be set up by means of rails or simply using a transport frame. In doing so, the spatial directions of all movements cross each other. In many cases, movements in individual operations are possible in multiple or all spatial directions.

In the layering process of the aforementioned methods, powder is placed, for example, in front of a scraper apparatus, spread out over the build space and smoothed. Various devices are used for this purpose. On the one hand, the powder may be provided upstream from the beginning of the build space. Slides that place a quantity of powder in the active area of the scraper apparatus are suitable for this purpose. On the other hand, powder may be continuously delivered in front of the scraper apparatus during the coating process.

All methods generate an overfeed, which accumulates up to the end of the coating path and/or is depleted from the original volume, depending on the method and setting. In this specification, this quantity is referred to as overfeed (overflow quantity). The overfeed is the quantity of powder that is pushed in front of the coater at the end of the build space during the coating pass.

If no overfeed occurs at the end of the coating path, the layer has not been completely filled to a relatively great degree of certainty. The presence of the overfeed at the end of the coating path is an indication that too much powder is being processed but the layer has been completely filled.

SUMMARY

The object of this invention, therefore, is to provide a method and a device which use this knowledge to document a reliable process flow and also to regulate it according to one preferred specific embodiment.

This object is achieved by a method and a device according to the teachings herein.

In one aspect, disclosed is a method for producing three-dimensional components, amorphous particulate material being applied in layers to a build space in a receiving plane, particulate material being placed on a build space in front of a scraper apparatus and then spread out, and the particulate material subsequently being selectively solidified. A measurement of an overfeed of particulate material is carried out.

In another aspect, the disclosure relates to a device for producing three-dimensional components, comprising a coating device which includes a scraper apparatus and comprising a selective solidification apparatus, at least one sensor for measuring an overfeed of particulate material being provided downstream from the coating device in the coating direction.

These aspects of the disclosure may be further characterized by one or any combination of the features disclosed herein. For example, these aspects of the disclosure may be further characterized by one or any combination of the following features: the measurement takes place during a coating pass; the measurement takes place at the end of a coating pass; the measurement takes place locally resolved; the measurement takes place over an entire coater width; a supply of particulate material is controlled directly by the measurement; the sensor is provided at the end of a coating path; one or more sensors are binary; one or more sensors are digital; one or more sensors are analog; one or more sensors are/or chromatographic sensors; a particulate material supply means is provided for supplying particulate material to a build space (preferably during a coating pass); or the particulate material supply means is controllable by the one or more sensors.

DETAILED DESCRIPTION

A number of terms are defined in greater detail below. Otherwise, the meanings known to those skilled in the art are to be understood for the terms used.

Within the meaning of the invention, "layering method" and "3D printing method" are all methods known from the prior art which facilitate the construction of components in three-dimensional molds and are compatible with the described process components and devices.

"Molded body" or "component" within the meaning of the invention are all three-dimensional objects that are produced with the aid of the method according to the invention and/or the device according to the invention and which have a nondeformability.

"Build space" is the plane or, in the broader sense, the geometric place on or in which the particulate material feedstock grows during the build process, due to repeated coating with particulate material. The build space is frequently delimited by a base, the "building platform," by walls and an open cover surface, the build plane.

According to the present description, a "reception plane" is understood to be the plane to which the build material is applied. It does not necessarily have to be a straight surface but may also have a curvature. This plane also does not absolutely have to correspond to a platform or conveyor belt plane. Instead, the reception plane may also be, for example, a material cone side of the build material.

According to the present invention, "spread out" means any way in which the particulate material is distributed. For example, a large amount of powder may be provided at the start position of a coating pass and be distributed into the layer volume or spread out by a blade or a rotating roller.

All free-flowing materials known for 3D printing may be used as "particulate material," in particular in powdered form, as slag or as a liquid. This may be, for example, sands, ceramic powders, glass powders and other powders made of inorganic materials, metal powders, plastics, wood particles, fibrous materials, celluloses and/or lactose powders as well as other types of organic, powdered materials. The particulate material is preferably a dry, free-flowing powder, although a cohesive, firm powder may also be used. This cohesiveness may also result from the admixture of a binder material or an auxiliary material.

The "overflow quantity" or "overfeed" is the quantity of particulate material that is pushed in front of the coater at the end of the build space during the coating pass.

Any known 3D printing device for layering that contains the necessary components may be used as the "device" for carrying out the method according to the invention. Common components include a coater, a build space, a means for moving the build space or other components, a dosing device and a heating means and other components which are known to those skilled in the art and therefore do not need to be listed in greater detail here.

A "coater" or "recoater" is the unit by means of which the particulate material is applied to or onto the build space. It may comprise a fluid storage container and a fluid application unit, the fluid application unit, according to the present invention, including a fluid outlet and a "scraper apparatus." This scraper apparatus could be a coater blade. However, any other conceivable, suitable scraper apparatus could also be used. For example, rotating rollers are conceivable.

A "selective solidification apparatus" may be, for example, a radiation source which solidifies the particulate material by supplying radiation. However, it may also be a print head which selectively applies the binder material and/or activator material or the like to the particulate material.

The "print head" is usually assembled from different components. These are the print modules, among other things. They are oriented relative to the print head. The print head is oriented relative to the machine. As a result, the location of a nozzle may be assigned to the machine coordinate system.

"Binder jetting layering" is understood to mean that powder is applied in layers onto a building platform, a liquid binder is printed onto the cross sections of the component on this powder layer, the position of the building platform is changed from the last position by one layer thickness, and these steps are repeated until the component is finished.

"Laser sintering layering" is understood to mean that powder is applied in layers onto a building platform, the cross sections of the component on this powder layer are melted with the aid of a laser beam and solidified by cooling, the position of the building platform is changed from the last position by one layer thickness, and these steps are repeated until the component is finished.

In "stereo lithography layering," the cross sections of the component are solidified by a laser beam in a container having a liquid, by means of a chemical reaction. The position of the building platform is changed from the last position by one layer thickness, and these steps are repeated until the component is finished.

Different aspects of the invention are described below.

In one aspect, the invention relates to a method for producing three-dimensional components, amorphous particulate material being applied in layers to a build space in a receiving plane, particulate material being placed on a build space in front of a scraper apparatus and then spread out, and the particulate material subsequently being selectively solidified. A measurement of an overfeed of particulate material is then carried out.

Common to all layering methods is that they have an overflow quantity of particulate material, which collects up to the end of the coating path and/or is depleted from the original volume, depending on the method and setting. This quantity is also referred to as overfeed. The overfeed is the quantity of powder that is pushed in front of the coater at the end of the build field during the coating pass.

If no overfeed occurs at the end of the coating path, it can usually be assumed that the layer has not been completely filled. The presence of the overfeed at the end of the coating path is an indication that too much powder is being processed, but the layer has been completely filled.

The present invention uses this property to document a secure process flow with regard to the particulate material coating.

According to one preferred specific embodiment of the invention, the method is carried out in such a way that the measurement of the overfeed takes place at the end of and/or during a coating pass.

According to one particularly preferred specific embodiment of the present invention, in the method, the measurement of the overfeed is locally resolved and is preferably carried out over an entire coater width.

This may take place using different methods. For example, multiple sensors may be disposed a short distance downstream from the build space in the width of the coater, and its signals may be distinctively evaluated. It is also conceivable to use a quasi-analog, locally resolved sensor. This analog signal must then be analyzed in terms of time. The overfeed, as described in this specification, may also be time-resolved by a special design of the device.

In a method of this type, it is now possible to obtain information, locally resolved, transversely to the coating direction. However, it should be noted here that this resolution is limited by the running together of the powder, due to the method.

Process defects, as used in the present case, are sites which are not filled with particulate material after the passage of the coater. Tests have shown that serious process defects begin on the build space and usually spread in the direction of the end of the coating path. A resolution which is relevant to the particular system may thus be determined. The density of the sensing elements may be determined or the evaluation method assessed with the aid of this resolution.

In a method according to the invention, the measurement of the particulate material distribution may also preferably take place during the coating pass, and a particulate material supply means may be controlled directly by the measurement.

If a regulation is to take place in addition to the measurement, a type of actuator should also be provided, which acts upon the powder quantity.

According to another aspect, the invention also relates to a device for producing three-dimensional components, comprising a coating device which includes a scraper apparatus and comprising a selective solidification apparatus. At least one sensor for measuring an overfeed of particulate material is provided downstream from the coating device in the coating direction.

If the sensor is provided at the end of a coating path, according to one preferred specific embodiment, whether an overfeed is or is not present may be measured at the end. As was already described above, coating defects spread over the application path and are thus also detectable at the end of the coating pass.

The sensors for measuring the overfeed may be binary, digital, analog and/or chromatographic sensors.

In principle, all sensors suitable for detecting the presence of powder may be used. Optical sensors, capacitive sensors as well as load cells are examples thereof.

All sensors should be disposed in such a way that they reliable detect the overfeed powder, and the same conditions again prevail layer by layer. To achieve the second effect, passive or active designs may be used. A passive design could be, for example, a powder waste shaft, into which the overfeed powder falls and is detected while falling.

The powder may likewise be first pushed to a measuring point and then into a waste shaft by the coater. This movement may also run in an integrated, continuous manner. In an active device, within the meaning of this invention, the status is forcibly reestablished by an add-on element. One example thereof could be a flap, on which the overfeed powder is sensed and subsequently flipped into a waste container.

A binary sensor within the meaning of the invention only determines whether overfeed powder is or is not present after the coating process. An arrangement of this type may be achieved, for example, with the aid of an initiator which is disposed downstream from the build space, beneath the coater plane. Its sensitive surface must be disposed in the direction of the overfeed powder. Optical and capacitive sensors, for example, are suitable.

An arrangement of this type is suitable only for detecting very serious faults in the coating operation. A defect location may not be made out.

A similar effect may be achieved by arranging multiple sensors downstream from the build space, transversely to the coating direction. Due to the increased resolution, this "digital sensor" is much more suitable for monitoring the coating operation. Much smaller defects may be detected with the aid of this arrangement, and the quantity of sensors may be adapted to the process conditions. The signal is locally resolved in this method.

If the overfeed powder is detected by an analog measuring apparatus, this may further improve the monitoring of the coating operation. A sensor of this type may be a weighing apparatus. The signal may quantitatively reflect the seriousness of the fault. A local resolution is not possible.

If the waste shaft is disposed at an angle to the coater and combines the powder in the waste shaft with the aid of an adjuster, conclusions may be drawn about the location of the fault by measuring the powder throughput over time. A large number of methods are suitable for this measurement. For example, light barriers as well as load cells may be used.

According to one preferred specific embodiment, in a device according to the invention, a particulate material supply means is provided for supplying particulate material to a build space during a coating pass.

If a regulation is to additionally take place, a type of actuator should also be provided, which acts upon the powder quantity.

Such a control of the particulate material supply means is controllable, for example, with the aid of sensors.

The present invention is explained in greater detail below on the basis of examples which illustrate the preferred specific embodiments.

The basic device for applying the invention is a device used in production in the sense of additive manufacturing. Powder-based methods are essential in this case.

Figure 1:
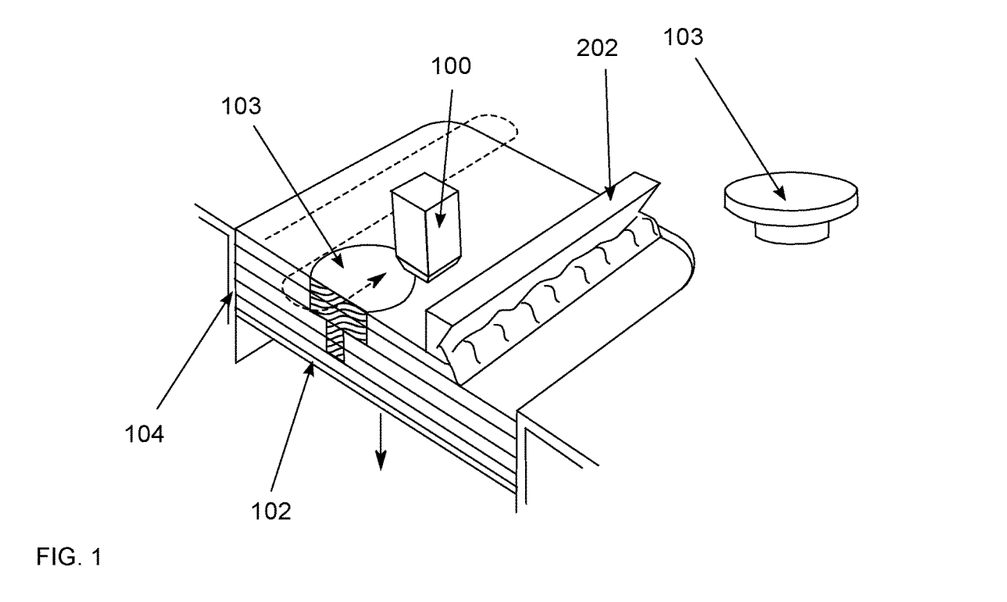
FIG. 1: shows a sectional view of a device for producing three-dimensional components by means of the binder jetting technique.
Figure 2A:
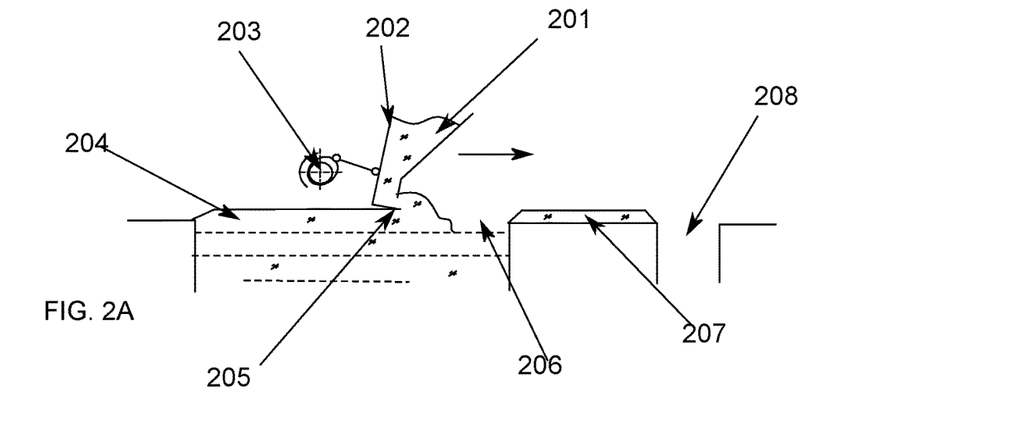
FIG. 2: shows an illustration of the overfeed during the coating operation, different positions of the coater being shown in FIG. 2A, FIG. 2B, and FIG. 2C.
Figure 2B:
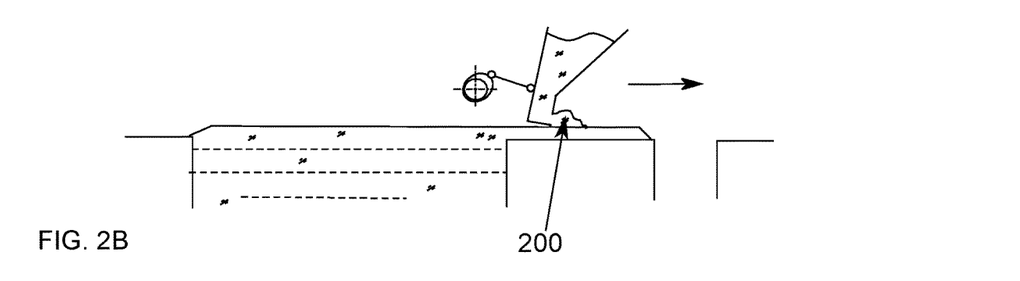
Figure 2C:
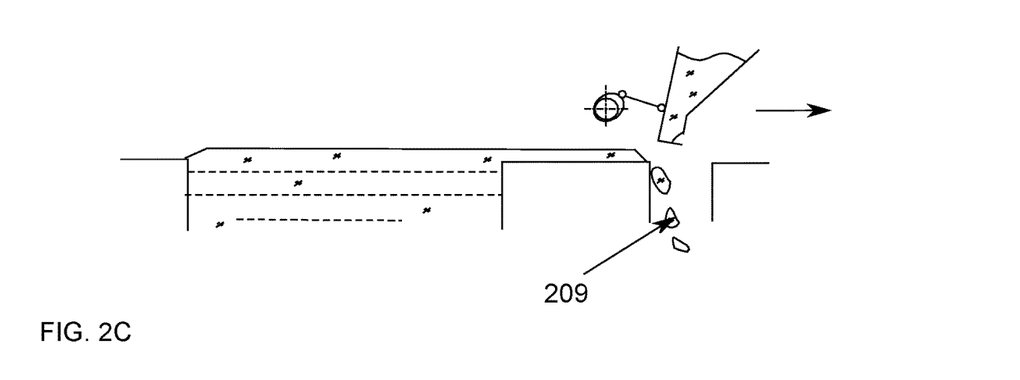

In powder-based methods, a thin layer of powder must be generated as the basis for the process. Examples thereof are illustrated in FIGS. 1 and 2. A particle layer is applied to a building platform (102), which is provided in a build container (104). In the method according to the prior art, this building platform (102) and its movement define the shape and geometry of the layer. Layers having exactly parallel bases and cover surfaces (204) are usually desirable. Building platform (102) is therefore precisely guided, and its movement defines the layer thickness.

This volume (206) is filled with powder by the so-called coater (202). A large amount of powder is usually provided at the start position of the coating pass and spread out into layer volume (206) by blade (205) or a rotating roller. However, the powder may also be delivered during the coating operation.

The quantity of powder may also be stored (201), for example, in the coater itself. The coater begins to dispense powder in the direction of travel at the beginning of the build space. Powder is continuously dispensed during the coating pass to compensate for the loss due to the filling of the layer or at least to ensure that sufficient material remains for filling at the end of the coating pass. Overfeed powder present at the end of the coating pass may be pushed past the edge of the build space and allowed to fall there (209).

The quantity of powder in front of the coater should not be unnecessarily large. Too large a quantity of powder is harmful to the layering process in two respects. On the one hand, a large quantity in front of the coater results in comparatively high forces on the emerging components in the powder. This may cause deformations. On the other hand, a large overfeed at the end of the coating pass is undesirable, since the material actually unused may be fed back to the process only after complex sieving. There is a high probability that this powder contains contaminants such as component fragments or traces of binding agent The flow of powder of the exemplary coating system with "inner storage" is switched by vibrations with the aid of an eccentric drive (203). The coater itself is designed as an elongated silo, which has a narrow opening on its lower end in the coating direction. The powder is unable to leave the narrow gap without vibrations, since bridges made of the particles form, or the powder flows out in a longitudinal gap (601). Either the bridges are broken or the material angle of repose is changed by the energy of the vibrations. The material flows out.

In this exemplary system, the outflow is limited by the quantity that forms the overfeed of the filling in front of the coater. A self-regulating principle is thus implemented.

Figure 3:
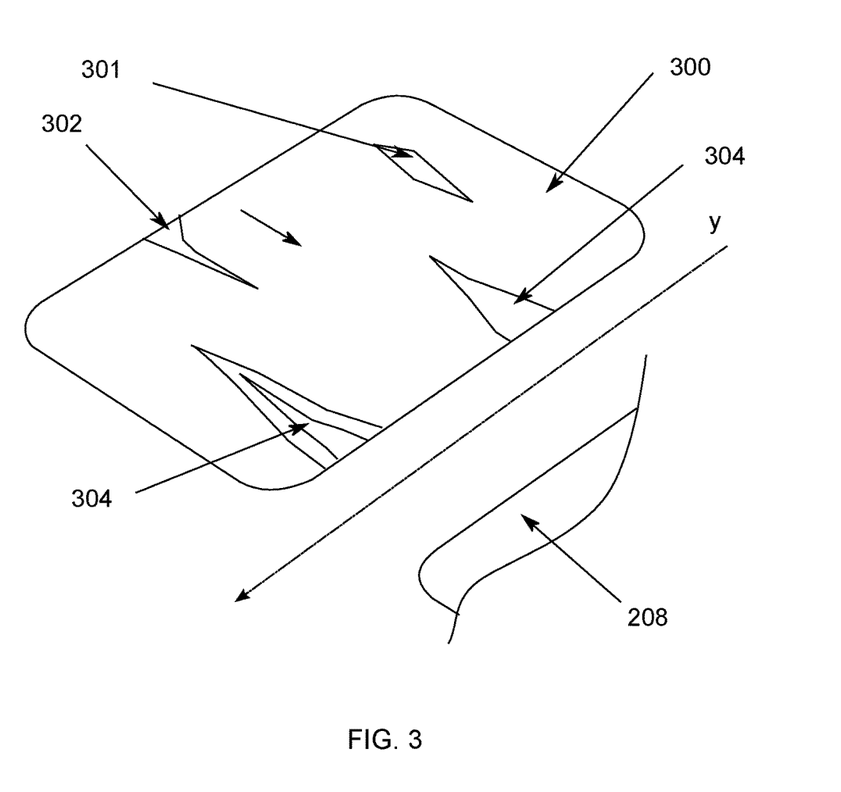
FIG. 3: shows an illustration of a propagation of coating defects during the coating operation.

Tests have shown that defects in the coating process are usually caused by insufficient reflowing of powder into volume (206) to be filled. Since these defects continue to develop during the coating pass, frequent and less frequent defect patterns occur (see FIG. 3). Defects that close again at the beginning of coating pass (302) are extremely rare. Local faults (301) in build space (300) without spreading to the rear likewise do not occur. The most frequent defects (303) start in the middle of build space (300) and increase in intensity up to the end of the coating path. An absence of the overfeed may therefore characterize faults in the coating operation very well. If a reaction does not occur, furrows (304) form, which become deeper layer by layer and divide the components.

A coater (202), driven via an eccentric (203), as illustrated in the example, is particularly suitable for a regulation. The upper limit of the powder quantity is regulated by the mechanism described. The lower limit may be easily observed by evaluating the overfeed.

In devices according to the prior art, the coater pushes overfeed (200) onward to a waste shaft (208) downstream from the build space, so that the powder does not disturb the rest of the build process. The part of the device downstream from the build space is usually covered by a thin quantity of powder (207), which is built up by the overfeed before the actual build process begins, like on the building platform.

Figure 4:
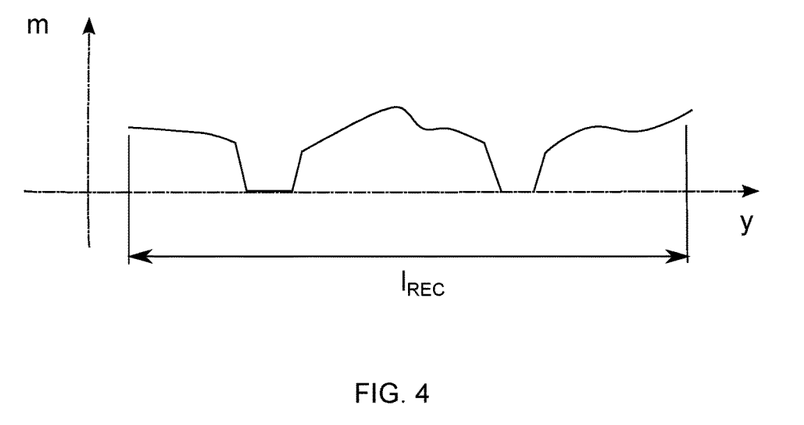
FIG. 4: shows a resulting overfeed over the length of the coater during the coating operation from FIG. 3.

FIG. 4 shows a diagram that represents the mass flow from the coater at a point in time. In the form of a diagram, the figure shows an example of the defect status of the coater which is to be detected by the method. It is apparent how blockages in the powder gap influence the outflow quantity.

Figure 5:
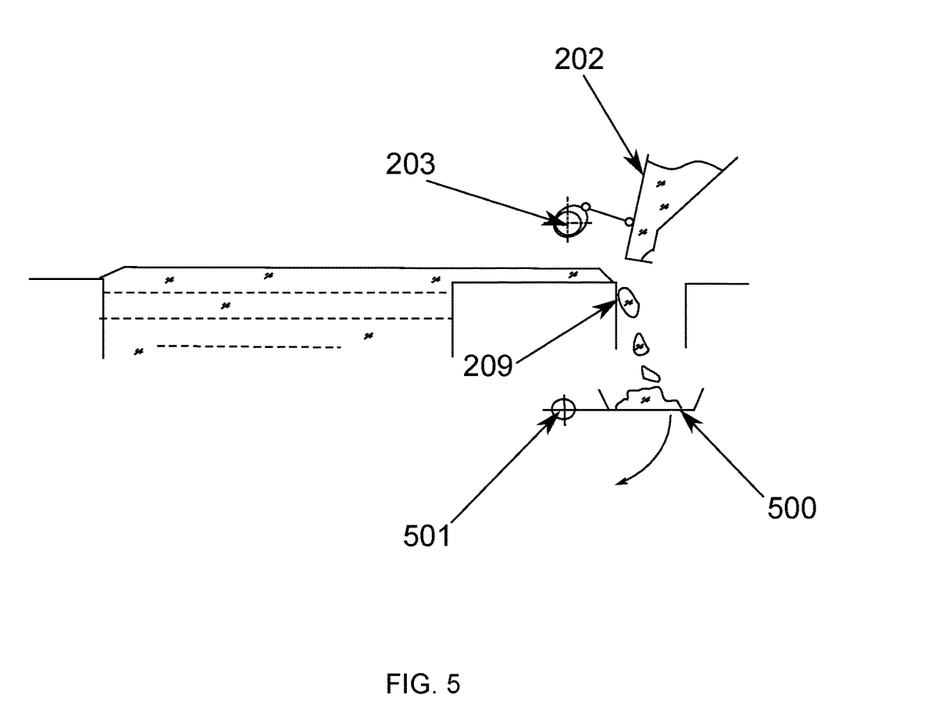
FIG. 5: shows a representation of a device for determining the overfeed quantity with the aid of a weighing device.

FIG. 5 shows a specific embodiment, in which overfeed (200) falls over the edge of build space (209) and then lands in the bowl of a weighing device (500), whereby overfeed (200) may be measured by weighing. After weighing, bowl (500) may be automatically emptied with the aid of a pivot joint (501).

Figure 6A:
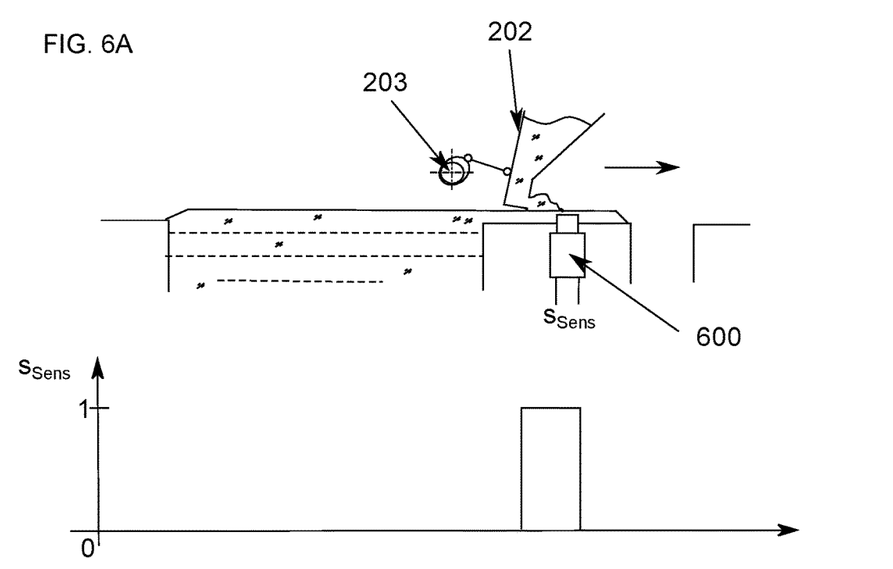
FIG. 6: shows a representation of a binary method for determining the presence of overfeed with the aid of a sensor.
Figure 6B:
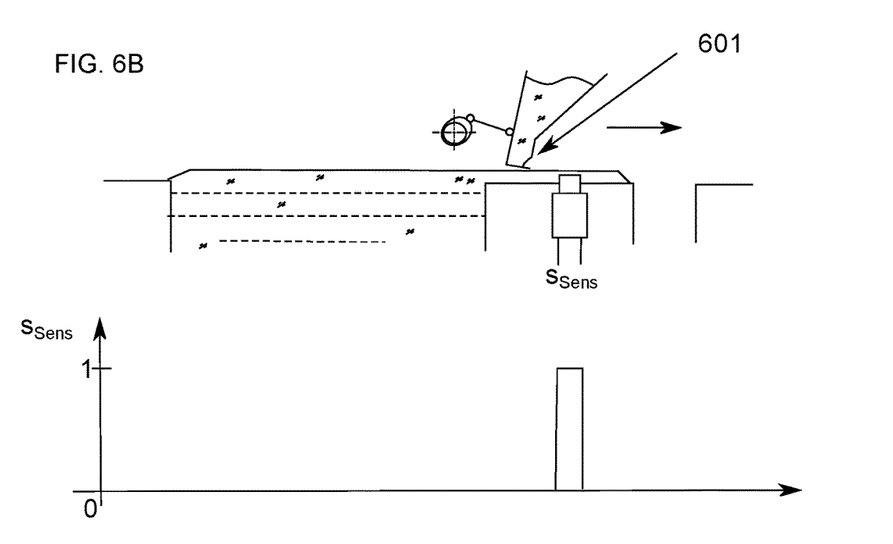

In the example illustrated in FIG. 6, capacitive sensors (600) are disposed upstream from waste shaft (208). One or multiple sensors is/are installed, depending on the desired resolution. They are adjusted in such a way that they do not detect the thin powder layer situated above them, which does not change during the build process. However, if an additional quantity of powder passes over sensors (600), they emit a signal.

Figure 7:
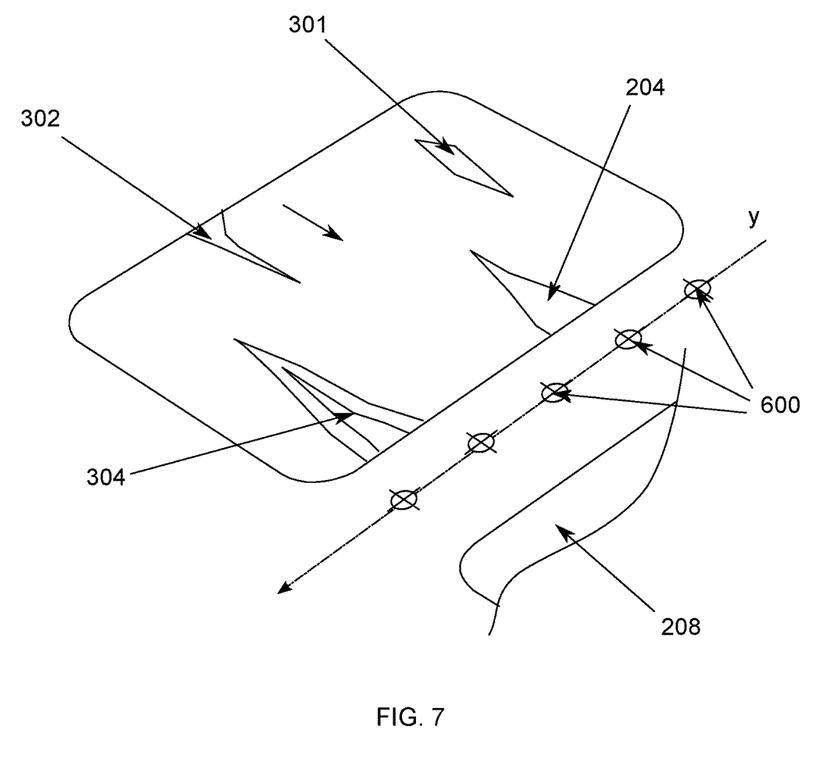
FIG. 7: shows a representation of an expanded, locally resolved determination of the overfeed.

The controller must ensure that the signals of the overfeed quantity and the coater body or the blade are differentiated. FIG. 7 shows the arrangement of the sensors relative to the build space. This may take place by precisely determining the position and matching it to the signal over time. The controller may likewise be designed in such a way that the coater with the overfeed stops at the height of the sensors and is moved backward a short distance, so that the sensor signal is not influenced. The measurement is thus no longer time-critical, and the requirements imposed on the evaluation are much less strict.

To achieve a spatial resolution of the information, multiple sensors (600) are installed in the exemplary device in a line in parallel to the coater. In this example, the coater is to be able to cover a build space width of 550 mm, and the sensors are distributed evenly over this length. As a result, defects having a dimension of approximately 50 mm may be reliably detected at the end of the build space.

At least one sensor for directly measuring an overfeed of the particulate material over an edge of the build space may be measured directly using at least one sensor (see for example FIGS. 5 and 7).

Figure 8A:
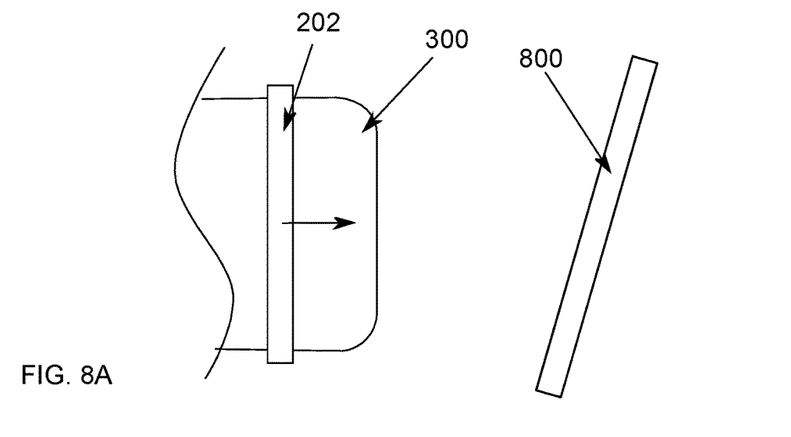
FIG. 8: shows a representation of an implementation of the spatial overfeed distribution in a time signal with the aid of a light barrier.
Figure 8B:
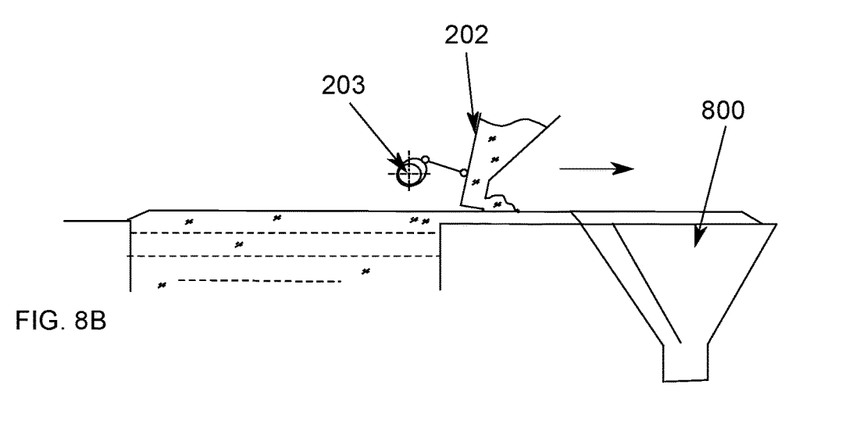
Figure 8C:
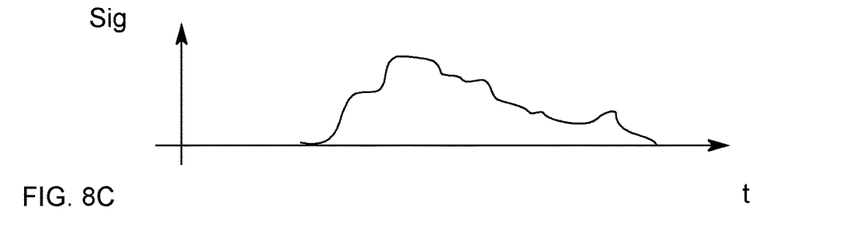

FIG. 8 illustrates another option for achieving a spatial resolution. In the top view a), the build space is illustrated from above, including the coater and a rotated powder waste shaft. As is apparent in the side view b), the waste powder flow is collected in a hopper. As a result, the overfeed powder would fall little by little into the hopper when it passes over the waste shaft, and thus results in a way to detect the local powder outflow quantity. FIG. 8C shows an example of a signal. It illustrates an outflow behavior in which less powder exits at the edges of the coater.

In this arrangement, five sensors are evaluated as follows: If one of the sensors does not supply a signal, the vibration is intensified during the generation of the next layer of the build process, in this case via the rotational speed of eccentric excitation means (203). If all sensors supply signals, the rotational speed is reduced for the next layer. This maintains the coating operation for the build process in a nearly optimum corridor.

Coater (202) itself is designed as an elongated silo, which has a narrow opening on its lower end in the coating direction. The powder is unable to leave the narrow gap without vibrations, since bridges made of the particles form, or the powder flows out in a longitudinal gap (601). Either the bridges are broken or the material angle of repose is changed by the energy of the vibrations. The material flows out.

Typical rotational speeds for the vibration excitation in the arrangement described above are around 3,000 rpm. The regulation adjusts the rotational speed of the coating by discrete values for each layer—the rotational speed is discretely reduced or increased, depending on the sensor result. The rotational speed is preferably adjusted in increments of 10 rpm. Increments of 50 rpm are even more preferable. Rapid changes in powder qualities may also be processed at 300 rpm—although the defect susceptibility continues to increase. In principle, there is no limit to the increment sizes in the rotational speed range of 0 to 6,000 rpm.

The regulation may also act upon other parameters, for example if the powder dispensing quantity is not controlled via the rotational speed. For example, the lift of a storage cylinder may be adapted. The lift is increased or reduced, depending on the sensor result.

The device described may also be used only for monitoring the process. The signal of sensors (600) is logged layer by layer for this purpose. This approach may be desirable when the parameters, which may be adjusted, influence, for example, the component properties, and this is unacceptable. The information may be additionally used to display a warning to the machine operator.

In the process flow of the machine, the printing of the build space using a print head (100) follows the coating pass. This may be followed by additional steps, depending on the process. After they are carried out, building platform (102) is moved and brought into a position which makes it possible to generate the next layer with the aid of the coater. The parameters which were changed by the regulation are used for this next coating pass. The coating pass is again evaluated by the regulating mechanism.

Components (103) are completed by continuously repeating this sequence.

LIST OF REFERENCE NUMERALS

100 Print head
102 Building platform
103 Component
104 Build container
200 Overfeed
201 Powder stock
202 Coater
203 Eccentric vibration drive
204 Cover layer/build space
205 Leveling blade
206 As yet unfilled layer area
207 Leveled powder outside the build space
208 Powder waste shaft
209 Falling overfeed powder
300 Build space
301 Inner coating defect
302 Coating defect at the coating pass starting point
303 Coating defect at the end of the build space
304 Deep coating defect
500 Bowl of a weighing apparatus
501 Pivot joint for automated emptying
600 Sensor for detecting powder
601 Clogged powder outflow
800 Rotated powder waste shaft

What is claimed is:

1. A device for producing three-dimensional components, comprising:
    prior to producing the three-dimensional components, a build container having a build space;
    a coating unit which includes a scraper apparatus, wherein the coating unit passes over the build container and applies a particulate material in layers;
    a selective solidification apparatus; and
    at least one sensor for directly measuring an overfeed of the particulate material over an edge of the build space;
    wherein the sensor is provided at an end of a coating path of the coating unit; and the overfeed is measured at the end of the coating path after the layer of the particulate material has been deposited onto the build space.

2. A device for producing three-dimensional components, comprising:
    prior to producing the three-dimensional components, a build container having a build space;
    a coating unit which includes a scraper apparatus for providing a particulate material in layers;
    a selective solidification apparatus; and
    at least one sensor for measuring a weight or load of an overfeed of the particulate material;
    wherein the overfeed is measured at the end of a coating path of the coating unit after the layer of the particulate material has been deposited onto the build space.

3. The device of claim 2, wherein the at least one sensor is provided at an end of the coating path.

4. The device of claim 2, wherein the at least one sensor includes multiple sensors arranged in a line parallel to the coating unit.

5. The device of claim 2, wherein a particulate material supply means is provided for supplying particulate material to a build space during a pass of the coating unit;
    optionally, wherein the particulate material supply means is controllable by the one or more sensors.

6. The device of claim 2, wherein the one or more sensors are binary, digital, analog, and/or chromatographic sensors.

7. The device of claim 2, wherein the device includes a controller for regulation of the coating unit based on the measured overfeed.

8. A device for producing three-dimensional components, comprising:
    a coating unit which includes a scraper apparatus for providing a particulate material in layers;
    a selective solidification apparatus; and
    at least one sensor for measuring an overfeed of the particulate material;
    wherein the at least one sensor is located in a side wall which the coating unit passes over and measures the particulate material above the at least one sensor;
    wherein the overfeed is measured at the end of a coating path of the coating unit after the layer of the particulate material has been deposited onto the build space.

9. The device of claim 8, wherein each of the at least one sensors is a binary sensor.

10. The device of claim 8, wherein the at least one sensors includes multiple sensors arranged in a line parallel to the coating unit.

11. The device of claim 8, wherein a particulate material supply means is provided for supplying particulate material to a build space during a pass of the coating unit;
   optionally, wherein the particulate material supply means is controllable by the at least one sensors.

12. The device of claim 9, wherein the at least one sensors includes multiple sensors arranged in a line parallel to the coating unit.

13. The device of claim 2, wherein the device includes a controller for regulation of the coating unit based on the measured overfeed;
   the at least one sensors includes multiple sensors arranged in a line parallel to the coating unit;
   optionally wherein the sensors are located in a side wall which the coating unit passes over, and measures the particulate material above the sensors.

14. The device of claim 2, wherein the device includes an angled waste shaft or a rotated powder waste shaft.

15. The device of claim 2, wherein the overfeed is resolved for identifying a location of a defect in the overfeed, transversely to a coating direction.

16. The device of claim 2, wherein the device is an active device which forcibly removes the overfeed of the particulate material.

17. The device of claim 1, wherein the device includes a plurality of the sensors, each of the sensors measure a overfeed at a different location along a length of the coating unit in an x-axis and the coating unit moves in a linear direction in a y-axis.

18. The device of claim 2, wherein the device includes a plurality of the sensors, each of the sensors measure a overfeed at a different location along a length of the coating unit in an x-axis and the coating unit moves in a linear direction in a y-axis.

19. The device of claim 8, wherein the device includes a plurality of the sensors, each of the sensors measure a local overfeed at a different location along a length of the coating unit in an x-axis and the coating unit moves in a linear direction in a y-axis.

* * * * *

UNITED STATES PATENT AND TRADEMARK OFFICE
CERTIFICATE OF CORRECTION

| | | |
|---|---|---|
| PATENT NO. | : 11,235,518 B2 | |
| APPLICATION NO. | : 15/364613 | |
| DATED | : February 1, 2022 | |
| INVENTOR(S) | : Ingo Ederer et al. | |

It is certified that error appears in the above-identified patent and that said Letters Patent is hereby corrected as shown below:

In the Claims

Column 12, Lines 18-19 delete "measure a local overfeed" and insert --measure an overfeed--

Signed and Sealed this
Seventeenth Day of May, 2022

*Katherine Kelly Vidal*

Katherine Kelly Vidal
*Director of the United States Patent and Trademark Office*